(12) United States Patent
König et al.

(10) Patent No.: US 6,307,006 B1
(45) Date of Patent: Oct. 23, 2001

(54) METHOD FOR PRODUCING BRANCHED POLYCARBONATES

(75) Inventors: Annett König, Krefeld; Lothar Bunzel, Kempen; Uwe Hucks, Alpen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/445,849

(22) PCT Filed: Dec. 14, 1999

(86) PCT No.: PCT/EP98/03653

§ 371 Date: Dec. 14, 1999

§ 102(e) Date: Dec. 14, 1999

(87) PCT Pub. No.: WO99/01495

PCT Pub. Date: Jan. 14, 1999

(30) Foreign Application Priority Data

Jun. 30, 1997 (DE) .............................................. 197 27 709

(51) Int. Cl.[7] .................................................. C08G 64/00
(52) U.S. Cl. .............................................................. 528/196
(58) Field of Search ............................................... 528/196

(56) References Cited

U.S. PATENT DOCUMENTS

| 3,544,514 | 12/1970 | Schnell et al. | 260/47 |
| 4,185,009 | 1/1980 | Idel et al. | 260/45.9 R |
| 4,415,722 | 11/1983 | Mark et al. | 528/196 |
| 4,550,155 | 10/1985 | Jones et al. | 528/176 |
| 5,597,887 | 1/1997 | King, Jr. et al. | 528/196 |

FOREIGN PATENT DOCUMENTS 2010777   2/1970   (FR) .

*Primary Examiner*—Terressa M. Boykin
(74) *Attorney, Agent, or Firm*—Joseph C. Gil; Aron Preis

(57) ABSTRACT

A process of producing branched polycarbonates by melt transesterification from at least one diphenol, diaryl carbonate and a branching agent, and in the optional presence of a catalyst is disclosed. The process which is carried out at temperatures between 80 to 400° C. and at pressures between 1 and 0.01 mbar, entails using as branching agent at least one member selected from the group consisting of (i) a specifically structured aliphatic alcohol and (ii) the ether of (i) which is formed by self-condensation.

6 Claims, No Drawings

METHOD FOR PRODUCING BRANCHED POLYCARBONATES

The present invention relates to a process for producing branched polycarbonates, by the melt transesterification of diphenols, diaryl carbonates and branching agents, optionally with the use of catalysts, at temperatures between 80 and 400° C. and at pressures between 1 atm. and 0.01 mbar, which is characterised in that tri- to hexahydric aliphatic alcohols of general formula (I)

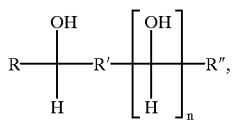

(I)

are used as branching agents,
wherein $R'$ is a single bond, a linear $C_1$–$C_{36}$ alkylene or a branched $C_3$–$C_{36}$ alkylene, preferably a linear alkylene comprising 1 to 18 C atoms,
wherein R and R" are the same or different, and denote H, a linear $C_1$–$C_{30}$ alkyl, a branched $C_3$–$C_{36}$ alkyl or R'"—OH, wherein R'" is a linear $C_1$–$C_{36}$ alkylene or a branched $C_3$–$C_{36}$ alkylene, and
wherein n is 2, 3, 4 or 5,
in amounts of 0.05 to 2 moles, preferably of 0.10 mole to 1.5 moles per 100 diphenol.

The preferred R and R" radicals are H—, $CH_3$— and $C_2H_5$—,
and the preferred R'" radicals are $CH_2$— and —$CH_2$—$CH_2$—.

In addition, suitable branching agents also include ethers, in fact monoethers and higher ethers also, which are formed by the self-condensation of alcohols of formula (I) with the separation of water.

The present invention thus relates to an extension of the process according to the invention, which is characterised in that instead of alcohols of formula (I) the ethers thereof, which are formed by self-condensation, are used in amounts of 0.05 moles to 2 moles, preferably of 0.1 mole to 1.5 moles, per 100 moles diphenol.

The polycarbonates produced by the process according to the invention are solvent-free and exhibit a light self-colour. They preferably have a low content of OH terminal groups of<1200 ppm, and are distinguished by their increased stability and intrinsic viscosity in the melt, and, compared with linear polycarbonate, by their reduced drip-off behaviour in the event of fire.

DE-A 15 70 533 describes the production of branched polycarbonates by the melt transesterification process. However, only phenolic compounds are employed as branching agents.

According to DE-A 25 00 092, 3,3-bis-(4-hydroxyaryl)-oxoindoles are used as branching agents for the production of branched polycarbonates.

EP-A 0 140 341 describes the production of a branched polycarbonate by way of the melt transesterification process, using triaryl esters of tricarboxylic acids, for example of trimellitic acid, as branching agents. In EP-A 0 708 130, 1,3,5-tris-(2-hydroxyethyl)-cyanuric acid (II)

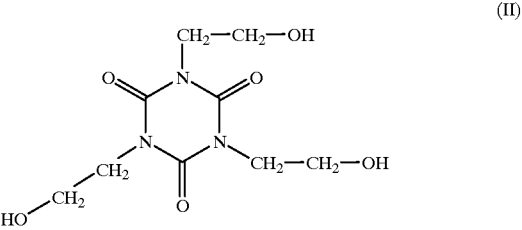

is cited, amongst other compounds, as a branching agent in a special 2-step process (page 4, line 33 of EP-A 0 708 130), but is not used in the examples.

At the temperatures of melt transesterification, however, compound (II) should be transformed and decomposed, with the separation of

The same applies to 3,4,5-trihydroxyphenylethyl alcohol (III)

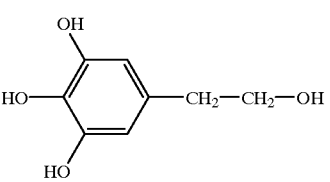

which is cited as a branching agent in EP-A 0 708 130 (page 4, line 41). Here also, the separation of

is conceivable.

In contrast, the aliphatic alcohols of formula (I) which are used according to the invention are thermally stable, and therefore do not decompose but are built up to form higher molecular weight ethers in all cases.

However, since aliphatic polyalcohols are not incorporated in a controlled manner in the phase boundary process used industrially, and since the process in organic solution which is termed the pyridine process is no longer used industrially, the process or melt transesterification according to the invention provides a practical process for incorporating aliphatic branching sites into thermoplastic, aromatic polycarbonates, with good reproducibility.

Thus the present invention also relates to thermoplastic, branched polycarbonates which can be obtained by the process according to the invention.

As mentioned above, these are distinguished by their high stability and intrinsic viscosity in the melt. At the same time, their drip-off behaviour in the event of fire is reduced compared with that of linear polycarbonate.

Examples of suitable alcohols (I) include pentaerythritol, glycerol, 1,2,3,6-hexanetetrol and 2,5-dimethyl-1,2,6-hexanetriol.

A suitable ether of (I) is dipentaerythritol, for example.

Diphenols which are suitable according to the invention are those of formula (IV)

HO—Z—OH (IV), wherein
Z is a divalent radical, which preferably comprises 6 to 30 C atoms, which can be mononuclear or polynuclear, which may contain hetero atoms, which may be bridged or in ring form, and which may optionally contain inert substituents which do not change or do not react, either under the reaction conditions of the method according to the invention or under the known processing conditions for the polycarbonates obtainable according to the invention.

Examples which can be cited include hydroquinone, resorcinol, bis-(hydroxyphenyl)-alkanes, bis-(hydroxyphenyl)-cycloalkanes, bis-(hydroxyphenyl) sulphides, -ethers, -sulphoxides and -sulphones, and α,α-bis-(hydroxyphenyl)-diisopropylbenzenes, as well as compounds thereof which comprise alkylated and halogenated nuclei.

Examples of suitable diphenols are described in U.S. Pat. Nos. 3,028,365, 299,835, 3,062,781, 3,148,172 and 4,982,014, in DE-OS 1 570 703 and 2 063 050, and in the monograph by H. Schnell, "Chemistry and Physics of Polycarbonates", Interscience Publishers, New York, 1964.

Preferred diphenols include
4,4'-dihydroxyphenyl,
2,2-bis-(4-hydroxyphenyl)-propane,
2,4-bis-(4-hydroxyphenyl)-2-methylbutane, 1,1-bis-(4-hydroxyphenyl)-cyclohexane,
α,α-bis-(4-hydroxyphenyl)-p-diisopropylbenzene,
α,α-bis-(4-hydroxyphenyl)-m-diisopropylbenzene,
2,2-bis-(3-methyl-4-hydroxyphenyl)-propane.
2,2-bis-(3-chloro-4-hydroxyphenyl)-propane,
bis-(3,5-dimethyl-4-hydroxyphenyl)-methane,
2,2-bis-(3,5-dimethyl-4-hydroxyphenyl)-propane,
bis-(3,5-dimethyl-4-hydroxyphenyl)-sulphone,
2,4-bis-(3,5-dimethyl-4-hydroxyphenyl)-2-methylbutane,
1-bis-(3,5-dimethyl-4-hydroxyphenyl)-cyclohexane,
α,α-bis-(3,5-dimethyl-4-hydroxyphenyl)-p-diisopropylbenzene,
1,1-bis-(4-hydroxyphenyl)-3,3,5-trimethylcyclohexane,
1,1-bis-(4-hydroxyphenyl )-3-methylcyclohexane,
1, -bis-(4-hydroxyphenyl)-3,3-dimethylcyclohexane,
1,1-bis-(4-hydroxyphenyl)-4-methylcyclohexane,
2,2-bis-(3,5-dichloro-4-hydroxyphenyl)-propane,
2,2-bis-(3,5-dibromo-4-hydroxyphenyl)-propane,
1,1-bis-(4-hydroxyphenyl)-1-phenyl-ethane,
2,2-bis-(3,5-dimethyl-4-hydroxyphenyl)-2-phenyl-ethane,
2,2-bis-(4-hydroxyphenyl)-2,2-diphenyl-ethane,
9,9-bis-(4-hydroxyphenyl)-fluorene,
9,9-bis-(3,5-dimethyl-4-hydroxyphenyl)-fluorene.

Examples of particularly preferred diphenols include
9,9-bis-(4-hydroxyphenyl)-propane,
2,2-bis-(3,5-dimethyl-4-hydroxyphenyl)-propane,
1,1-bis-(4-hydroxyphenyl)-cyclohexane,
1,1-bis-(4-hydroxyphenyl)-1-phenyl-ethane,
1,1-bis-(4-hydroxyphenyl)-3,3,5-trimethylcyclohexane,
1,1-bis-(4-hydroxyphenyl)-3-methylcyclohexane,
1,1-bis-(4-hydroxyphenyl)-4-methyl-cyclohexane.
9,9-bis-(3,5-dimethyl-4-hydroxyphenyl)-fluorene.

Most preferred diphenols include
2,2-bis-(4-hydroxyphenyl)-propane,
1,1-bis-(4-hydroxyphenyl)-3,3,5-trimethylcyclohexane, and
1,1-bis-(4-hydroxy-phenyl)-1-phenyl-ethane.

Any mixtures of the aforementioned diphenols can also be used.

Carboxylic acid esters in the sense of the present invention are di-$C_6$–$C_{14}$-aryl esters, preferably the diesters of phenol or alkyl-substituted phenols, namely diphenyl carbonate or dicresyl carbonate.

The carboxylic acid diesters are used in an amount of 1.01 to 1.30 moles, preferably 1.02 to 1.15 moles, with respect to 1 mole of bisphenol.

The diphenols, carboxylic acid diesters and branching agents are used in as pure a form as possible; this is self-evident to one skilled in the art. Pure diphenols and pure carboxylic acid esters are obtained in the known manner by recrystallisation, as is known to one skilled in the art. Washing or distillation are other possible ways of purifying the diphenols and carboxylic acid esters.

The catalysts which are preferably used are the ammonium and phosphonium salts which are known from the literature (see, for example, U.S. Pat. No. 3,442,864, JP-A-14742/72, U.S. Pat. No. 5,399,659 and DE-A-19 539 290).

Examples thereof include those of formulae (Va) and (Vb)

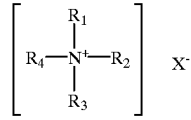

(Va)

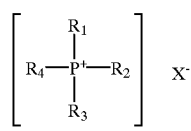

(Vb)

wherein
$R_1$ to $R_4$, independently of each other, can be $C_1$–$C_{16}$ alkyls, aryls, or cycloalkyls, and $X^-$ is an anion, of which the corresponding acid-base pair $H^+ + X^- \leftrightarrows HX$ has a $pK_B$ of $<11$.

Examples of suitable ammonium salts or phosphonium salts include:
tetramethylammonium tetraphenylborate,
tetraphenylphosphonium phenolate,
tetraphenylphosphonium fluoride,
tetraphenylphosphonium tetraphenylborate,
dimethyldiphenylammonium hydroxide,
tetraethylammonium hydroxide,
tetramethylammonium hydroxide,
tetramethylammonium acetate, and
tetramethylamonium fluoride.

The catalysts which are preferably used also include guanidines according to U.S. Pat. No. 5,319,066. Imidazoles are also suitable.

The catalysts are preferably used in amounts of $10^{-8}$ to $10^{-4}$ moles, most preferably in a concentration of $10^{-7}$ to $10^{-5}$ moles with respect to 1 mole diphenol.

The catalysts may be used on their own or in combination with each other; they may be added at the start of the process or may be added only during the course of the process.

If catalyst combinations are used, alkali metal or alkaline earth metal compounds or salts may also be used in conjunction, in fact during the course of the process, namely during the condensation polymerisation phase, as has already been disclosed in U.S. Pat. No. 5,399,659 which was cited above.

The process according to the invention can generally be carried out in one step, wherein all the reactants are then fused at temperatures of 80° C. to 250° C., preferably 100 to 230° C., and particularly at 120 to 190° C., and under normal pressure, over 0.1 to 5 hours, preferably within 0.25 to 3 hours.

In the course of this procedure, the branching agents used according to the invention can first be added somewhat later to the melt of diphenols and diaryl carbonates.

Thereafter, an oligocarbonate is produced by distilling off the monophenol, by applying a vacuum and increasing the temperature. Following this, the polycarbonate is produced by further increasing the temperature to 240 to 400° C. and by reducing the pressure to 0.01 mbar.

Without the use of catalysts, the reaction according to the invention necessitate very long reaction times. Therefore the reaction is preferably conducted using one or two catalysts.

When one catalyst is used, this is either added before fusion or is added to the melt before the production of oligocarbonate.

When two catalysts are used, these are preferably added separately, with one being added to the reactants at the outset and the other being added to the melt of oligocarbonate.

The reaction times can thereby be reduced and the reaction temperatures can be reduced, particularly in the condensation polymerisation phase.

The chronologically separate addition of two catalysts is generally employed when the process is conducted in steps, namely when the reaction is interrupted at least one point. This is preferably effected after the oligocarbonate step has been reached.

In the course of this procedure, as mentioned above, alkali metal or alkaline earth catalysts are preferably also used in the second step, in amounts of $10^{-8}$ to $10^{-4}$ moles, preferably of $10^{-7}$ to $10^{-5}$ moles, per mole of diphenol which was originally used. Examples include lithium, sodium, potassium, caesium, calcium, barium and magnesium hydroxides, carbonates, halides, phenolates, diphenolates, fluorides, acetates, phosphates, hydrogen phosphates and borohydrides.

When the process is conducted in steps, this also provides the option of adding the branching agents even later, namely adding them first to the oligocarbonate.

The branching agents used according to the invention can be added without solvent, solid or molten, as a solution in water, fused in phenol or as a concentrate in the oligo or polycarbonate concerned.

Phenols which are not readily volatilised, such as camylphenol or 4-phenylphenol, can be deliberately added in amounts of 0.01–10 mole % per mole of diphenol in order to regulate the molecular weight, i.e. for chain termination.

In the two-step procedure for the production of oligocarbonates, the temperature is maintained between 100 and 290° C., preferably between 150 and 280° C. For the condensation polymerisation of the oligocarbonates the temperature is maintained between 230° C. and 400 ° C., preferably between 250 and 320° C.

The pressure range for the production of the oligocarbonates is between 1 bar and 0.5 mbar, preferably between 500 mbar and 1 mbar.

The pressure range for condensation polymerisation is between 100 mbar and 0.01 mbar.

The oligocarbonates have average molecular weights $M_W$ of 3000 to 24,000, preferably from 5000 to 20,000, as determined by measuring the relative solution viscosity in dichloromethane or in mixtures of equal parts by weight of phenol/o-dichlorobenzene, which are calibrated by light scattering.

The polycarbonates which are obtainable according to the invention have weight average molecular weights of 12,000 to 60,000, preferably 15,000 to 40,000, as determined by measuring the relative solution viscosity in dichloromethane or in mixtures of equal parts by weight of phenol/o-dichlorobenzene, which are calibrated by light scattering.

The process according to the invention ca be conducted continuously or batch-wise, for example in stirred vessels, thin film evaporators, falling film evaporators, stirred vessel cascades, extruders, kneaders, simple plate reactors and high-viscosity plate reactors.

The additives, stabilisers, fillers and reinforcing agents which are typical for polycarbonate can be added to the polycarbonate produced according to the invention to improve the properties thereof. Amongst others, the following adjuvant substances are suitable as such: stabilisers (e.g. UV, thermal and gamma ray stabilisers), anti-static agents, flow enhancers, demoulding agents, flame retardants, pigments, finely divided minerals, fibrous substances e.g. alkyl and aryl phosphites, phosphates and phosphanes, low molecular weight carboxylic acid esters, halogen compounds, salts, chalk, quartz flour, glass and carbon fibres.

Moreover, other polymers can also be admixed with the polycarbonates according to the invention, e.g. polyolefines, polyurethanes, polystyrene.

These substances are preferably added to the finished polycarbonate in conventional processing units.

The polyearbonates produced according to the invention are suitable both for extrusion and for processing by injection moulding. On account of the outstanding stability of molten lengths thereof, they are also suitable for the production of hollow bodies by the blow-moulding process. Their excellent intrinsic viscosity properties enable extruded sheets with good mechanical properties and reduced stress cracking corrosion easily to be obtained, for example. Mouldings and moulded parts of all types can be produced by injection moulding, such as housings, coil bodies, covers, domestic appliances, etc.

EXAMPLES

The MV number can be employed for characterising the branching of polycarbonates. This is defined as a ratio of the melt viscosities at $10 \text{ s}^{-1}$ and $10^3 \text{ s}^{-1}$. The larger this ratio is, the greater is the departure from Newtonian behaviour, i.e. the higher is the intrinsic viscosity.

Comparative Example 1

114.15 g (0.005 moles) bisphenol A and 113.45 g (0.530 moles) diphenyl carbonate were weighed into a 500 ml three-necked flask fitted with a stirrer, internal thermometer and a Vigreaux column (30 cm, metal-coated) and bridge. The apparatus was freed from atmospheric oxygen by applying a vacuum and flushing with nitrogen (3 times), and the mixture was heated to 150° C. 0.0074 g ($4*10^{-1}$ mole %) of an addition product comprising 70% tetraphenylphosphonium phenolate and 30% phenol with respect to bisphenol A were then added, and the resulting phenol was distilled off at 100 mbar. At the same time, the temperature was increased to 250° C. After 1 hour, the vacuum was enhanced to 10 mbar. Condensation polymerisation was effected by reducing the vacuum to 0.5 mbar and increasing the temperature to 280° C.

Example 1

114.15 g (0.005 moles) bisphenol A, 113.45 g (0.530 moles) diphenyl carbonate and 0.003 moles (0.204 g) pentaerythritol were weighed into a 500 ml three-necked flask fitted with a stirrer, internal thermometer and a Vigreaux column (30 cm, metal-coated) and bridge. The apparatus was freed from atmospheric oxygen by applying a vacuum and flushing with nitrogen (3 times), and the mixture was heated to 150° C. 0.0074 g ($4*10^{-3}$ mole %) of an addition product comprising 70% tetraphenylphosphonium phenolate and 30% phenol with respect to bisphenol A were then added, and the resulting phenol was distilled off at 100 mbar. At the same time, the temperature was increased to 250° C. After 1 hour, the vacuum was enhanced to 10 mbar. Condensation polymerisation was effected by reducing the vacuum to 0.5 mbar and increasing the temperature to 280° C.

Example 2

The procedure was as in example 1, except that 0.004 moles (0.272 g) pentaerythritol were used.

Example 3

The procedure was as in example 1, except that 0.008 moles (0.544 g) pentaerythritol were used.

Example 4

The procedure was as in example 1, except that 0.003 moles (0.381 g) dipentaerythritol were used.

Example 5

The procedure was as in example 1, except that 0.008 moles (1.016 g) dipentaerythritol were used.

| Ex. | Branching agent | Branching agent in mole % | phenolic OH in ppm | $\eta_{rel}$* (melt) | $\eta_{rel}$* (length) | MV number | Colour number |
|---|---|---|---|---|---|---|---|
| Comp. 1 | — | — | 380 | 1.246 | 1.232 | 1.80 | 0.28 |
| 1 | pentaerythritol | 0.3 | 260 | 1.328 | 1.319 | 2.55 | 0.30 |
| 2 | pentaerythritol | 0.4 | 380 | 1.335 | 1.330 | 3.27 | 0.30 |
| 3 | pentaerythritol | 0.8 | 360 | 1.396 | 1.378 | 5.32 | 0.32 |
| 4 | dipentaerythritol | 0.3 | 300 | 1.317 | 1.299 | 2.58 | 0.35 |
| 5 | dipentaerythritol | 0.8 | 320 | 1.398 | 1.381 | 3.97 | 0.31 |

*measured in dichloromethane at 25° C. and 5 g/l.

What is claimed is:

1. In the process of producing branched polycarbonates by melt transesterification from at least one diphenol, diaryl carbonate and a branching agent, and in the optional presence of a catalyst, at temperatures between 80 to 400° C. and at pressures between 1 and 0.01 mbar, the improvement comprising using as branching agent, about 0.05 to 2 moles per 100 moles of said diphenol, at least one member selected from the group consisting of (i) an aliphatic alcohol conforming to

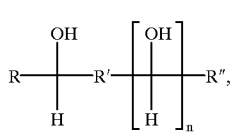

(I)

wherein R' is a single bond, a linear $C_{1-36}$-alkylene or a branched $C_{3-36}$-alkylene and R and R" independently denote H, linear $C_{1-36}$-alkyl, branched $C_{3-36}$-alkyl or R'''-OH where R''' is a linear $C_{1-36}$-alkylene or a branched $C_{3-36}$-alkylene, and n is 2,3,4 or 5, and (ii) the ether of said (i) which is formed by self-condensation.

2. The process of claim 1 wherein said branching agent is (i).

3. The process of claim 1 wherein said branching agent is (ii).

4. A thermoplastic, branched polycarbonate obtained by the process of claim 1.

5. The thermoplastic, branched polycarbonate prepared by the process of claim 2.

6. The thermoplastic, branched polycarbonate prepared by the process of claim 3.

* * * * *